US005492620A

United States Patent [19]
Evans

[11] Patent Number: 5,492,620
[45] Date of Patent: Feb. 20, 1996

[54] APPARATUS FOR REMOVING CONTAMINANTS FROM A WASTE STREAM

[76] Inventor: Steven T. Evans, 1902 Mary Dott Way, Salt Lake City, Utah 84106

[21] Appl. No.: 207,968

[22] Filed: Mar. 9, 1994

Related U.S. Application Data

[63] Continuation-in-part of Ser. No. 40,627, Mar. 31, 1993, abandoned.

[51] Int. Cl.$^6$ .............................. C02F 1/62; B01D 21/01; B01D 21/08
[52] U.S. Cl. .................. 210/96.1; 210/202; 210/205; 210/207; 210/521; 210/534
[58] Field of Search ................................ 210/201, 202, 210/205, 207, 521, 534, 96.1

[56] References Cited

U.S. PATENT DOCUMENTS

| | | |
|---|---|---|
| 2,119,013 | 5/1938 | Kerns . |
| 2,129,267 | 9/1938 | Fischer . |
| 2,673,451 | 3/1954 | Gariel . |
| 2,782,929 | 2/1957 | Colket . |
| 2,799,645 | 7/1957 | Musgrove ................................ 210/521 |
| 2,817,440 | 12/1957 | Casner et al. ............................ 210/521 |
| 2,874,895 | 3/1959 | McLain .................................... 210/521 |
| 3,337,452 | 8/1967 | Teske et al. . |
| 3,460,677 | 8/1969 | Fifer ........................................ 210/199 |
| 3,715,308 | 2/1973 | Sulfaro et al. ........................... 210/720 |
| 3,826,740 | 7/1974 | Jewett ..................................... 210/521 |
| 4,054,339 | 8/1977 | Korenowski et al. . |
| 4,326,952 | 4/1982 | Blake ...................................... 210/521 |
| 4,536,286 | 8/1985 | Nugent .................................... 210/521 |
| 4,755,303 | 7/1988 | Sweat . |
| 5,288,737 | 2/1994 | Krieger .................................... 210/199 |

Primary Examiner—Neil McCarthy
Attorney, Agent, or Firm—Norton R. Townsley

[57] ABSTRACT

This invention includes a first balance pH tank, a clarifier tank and a final pH balance tank. The first tank periodically receives a certain volume of the waste stream. This tank is equipped with an automatic system for raising the pH so that all the heavy metals will precipitate as oxides and hydroxides. Next the stream is transferred to the clarifier tank. The clarifier tank has a number of internal vertical baffles. The first baffles have perforations near their lower ends. The stream flows from one chamber to the other over or under the first baffles or through their perforations. Then the stream flows over the last baffle. In the clarifier, the precipitate accumulates at the bottom of the tank and the pH drops. Lastly, the stream is transferred to a final pH balance tank where the pH is adjusted to about 7.

45 Claims, 8 Drawing Sheets

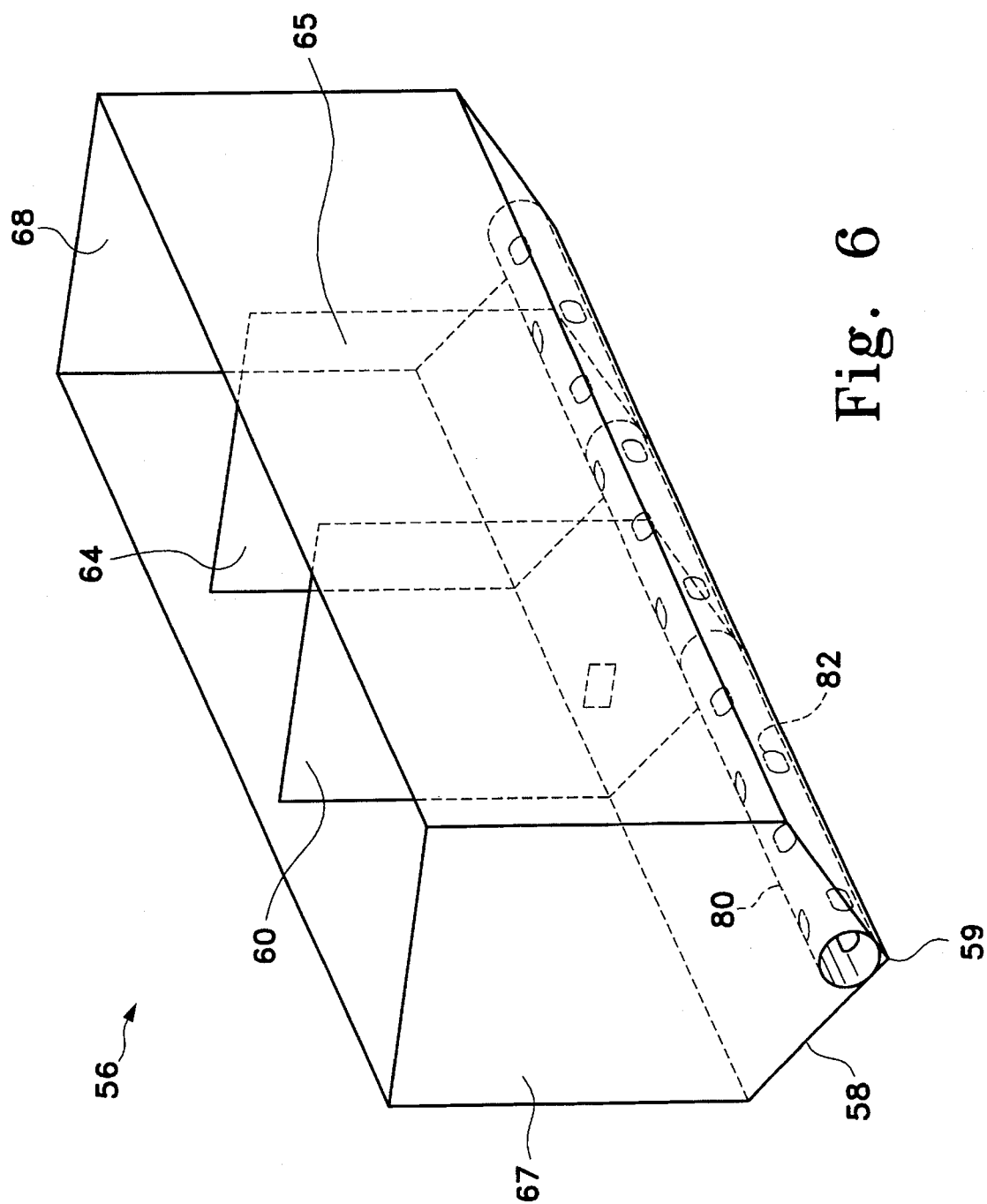

APPARATUS FOR REMOVING CONTAMINANTS FROM A WASTE STREAM

REFERENCE

This Application is a Continuation in Part Application for application Ser. No. 08/040,627, filed Mar. 31, 1993, abandoned.

TECHNICAL FIELD

The present invention relates to the field of waste treatment and more specifically to devices for removing heavy metal and other harmful contaminants from a waste stream. This invention is useful in the fields of metal finishing, mining, hazardous site clean-up, metal recovery and other allied fields.

BACKGROUND OF THE INVENTION

A plating shop typically generates a waste stream that includes nickel, chromium, copper, zinc, cyanide, and other ions. Current technology for treating a waste stream from a plating shop generally involves separating the waste stream into alkaline, acid, chromate and cyanide waste streams. The cyanide stream is made strongly alkaline and is treated with a hypochlorite (bleach) to totally destroy the cyanide. The chromate containing stream is treated with metabisulfite or sulfur dioxide in order to reduce the hexavalent chromium to the trivalent state. Then all streams are combined and made strongly alkaline. This forces all the heavy metals to precipitate as oxides and hydroxides. Usually a flocculant is added to encourage full precipitation.

At this point the precipitates can be filtered out of the combined waste stream. Then the stream is neutralized with an acid. The treatment system is complex, including many tanks; feed loops, under automatic control, for introducing reagents to these tanks; impellers or equivalent devices for adequate mixing of reagents with the waste streams; and at least one filter press for separating the water from the precipitated metals. Not infrequently, the whole system is under computer control. Plating wastes treated in this manner typically meet requirements for discharge into water courses and sanitary sewers. The sludges generated are generally trucked to a sanitary landfill.

It can be readily appreciated that the system described above is large, costly, and requires massive quantities of chemicals for its operation. Further it is not readily amenable to treatment of acid mine waste and clean up of hazardous waste sites. The types of systems suitable for treating acid mine wastes, for recovering metals, and for removing heavy metals from the soil at hazardous waste sites vary considerably from the typical plating waste treatment system described above. Such systems are typically designed for each specific application and so no generalized design can be given.

Development of a treatment system which can remove heavy metals and other harmful contaminants from plating waste streams, acid mine wastes and hazardous waste sites or recover valuable metals in a simple and economical manner represents a great improvement in the field of waste treatment and satisfies a long felt need of the waste treatment industry.

DISCLOSURE OF THE INVENTION

The present invention is an apparatus which can remove heavy metal and other harmful contaminants from a waste stream. At the same time this invention adjusts the pH of the stream. This invention has application in the metal finishing industry, where it can be used to remove contaminants prior to discharge into water courses or sanitary sewers; the mining industry, where it can be used to remove contaminants from acid mine wastes; hazardous site clean-up, where it can be used to remove contaminants from the soil; metal recovery; and other allied fields.

The heart of this invention comprises a first balance pH tank, a clarifier tank and a final pH balance tank. The first tank periodically receives a certain volume of the waste stream. This tank is equipped with an automatic system for raising the pH to and maintaining the pH at a desired value as well as some means for stirring. Generally a caustic solution is added to raise the pH. The pH value is selected to be high enough so that all the heavy metals will precipitate as oxides and hydroxides. A stirring mechanism keeps the precipitate in suspension.

Next the stream is transferred to the clarifier tank. The clarifier tank has a number of internal vertical baffles, which essentially separate the tank into a number of smaller chambers. The first baffles have perforations near their lower ends. The last baffle, however, has no perforations. The first baffles are located and sized so that the stream can only flow from one chamber to the other over or under the first baffles or through their perforations. The last baffle is sized so that the stream flows over it into the last chamber of the clarifier tank. In the clarifier, the precipitate accumulates at the bottom of the tank and the pH drops. It has been found that different metal precipitates accumulate in different chambers.

At this point the water in the last chamber may be satisfactory for reuse or discharge. Generally, water from the last chamber will meet local requirements for discharge to water courses or sanitary sewers. If it does not meet requirements it will only be because the pH is too high. Therefore, as a last step, the stream is transferred from the last chamber of the clarifier to a final pH balance tank. This tank is equipped with an automatic system for lowering the pH to and maintaining the pH at about 7 as well as some means for stirring. Generally an acid solution is added to lower the pH.

The bottom of the clarifier tank may be flat or of any other convenient shape. Periodically, the precipitated metals must be removed from the clarifier. While this can be accomplished by draining the tank a better alternative is to place a perforated tube or tubes, which are accessible from outside of the tank, in the bottom of the tank. With appropriate control valves, and if necessary, a vacuum pump, the precipitate can be removed without draining the tank. It can be readily appreciated that a V-shaped bottom may be most desirable for this arrangement.

Another useful variation is to make the locations of the baffles variable. Or more baffles can be added as required by changing composition of the waste stream. In this way the performance of each installation can be optimized in the field. Furthermore, if the waste stream includes cyanides and high levels of chromium, automatic cyanide destruction and hexavalent chromium reduction can be added to the first tank. Moreover, selenium can be precipitated from the first tank by addition of sodium dimethyldithiocarbamate and oxygen. Additionally, if necessary to aid precipitation, a flocculant may be added to the first tank.

This invention, when used to treat plating shop wastes, has fewer components than conventional systems. Consequently it is smaller, cheaper and uses fewer types of chemicals than conventional systems. Chemical usage during operation is also lower. A large version of this invention is useful for treatment of acid mine wastes, and for hazardous site clean up.

An appreciation of the other aims and objectives of the present invention and a more complete and comprehensive understanding of it may be achieved by referring to the accompanying drawings and studying the following description of a preferred embodiment.

BRIEF DESCRIPTION OF THE DRAWINGS

FIG. 6 is a three dimensional drawing showing the preferred clarifier tank bottom and sludge removal tube.

BEST MODE FOR CARRYING OUT INVENTION

Figure 1:
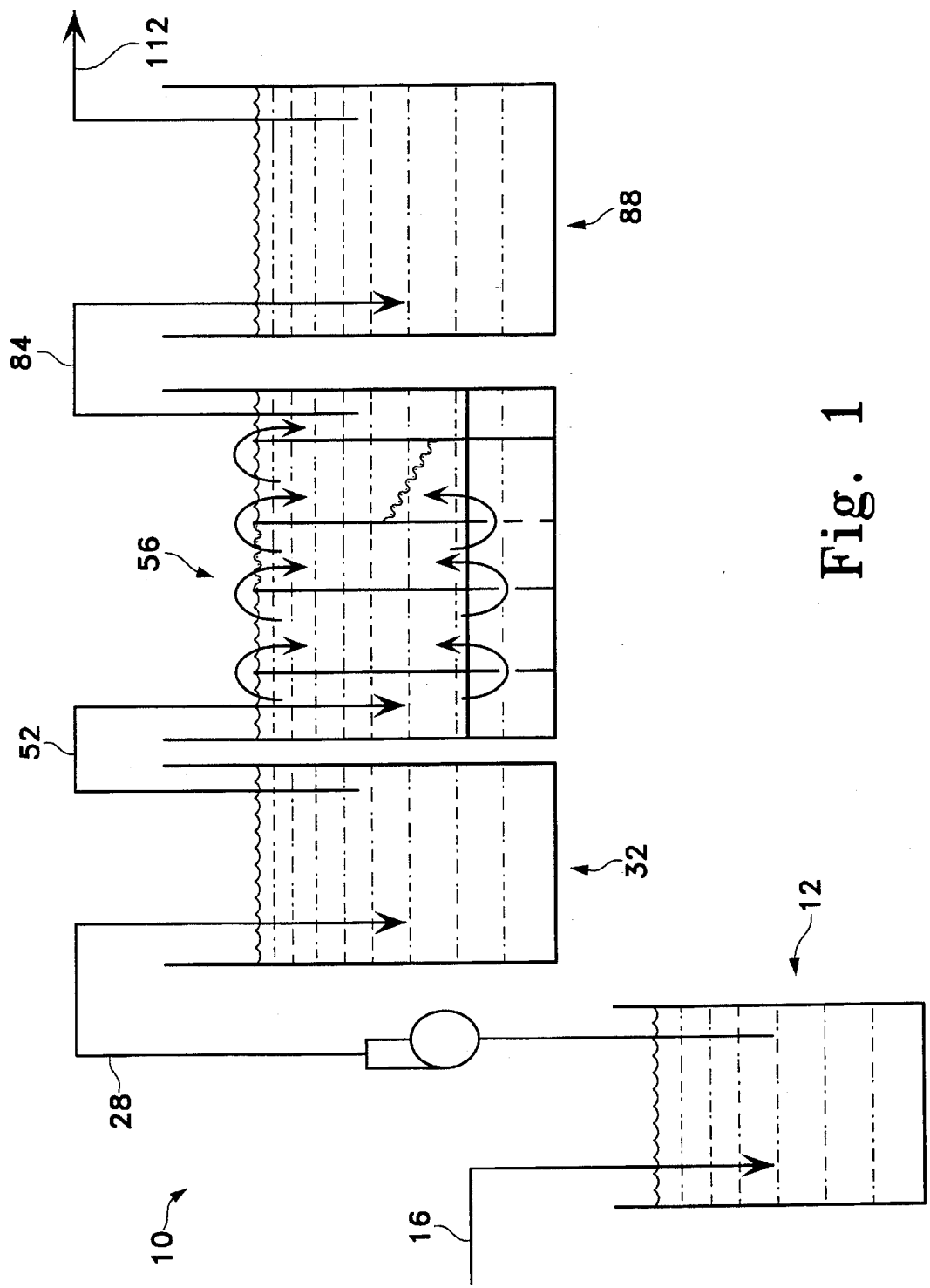
FIG. 1 is a flow diagram of the steps or tanks involved in this invention.

FIG. 1 is an overall sketch of this invention 10. For ease of comprehending the overall invention much detail has been eliminated from this Figure. The preferred embodiment of this invention comprises four separate tanks or processes: sump 12, preliminary pH adjustment 32, clarifier 56, and final pH adjustment 88. The waste stream flows into the invention at 16. The waste stream can be plating shop waste, acid mine run-off, soil leachate or water from a contaminated pond. The stream flows from one tank or process step to the other as indicated by the transfer mechanisms 28, 52, 84. The fluid flows within the clarifier tank 56 as shown by the curved arrows within the clarifier tank 56. Treated effluent flows from the invention at 112. Further details are more fully explained below.

Figure 2:
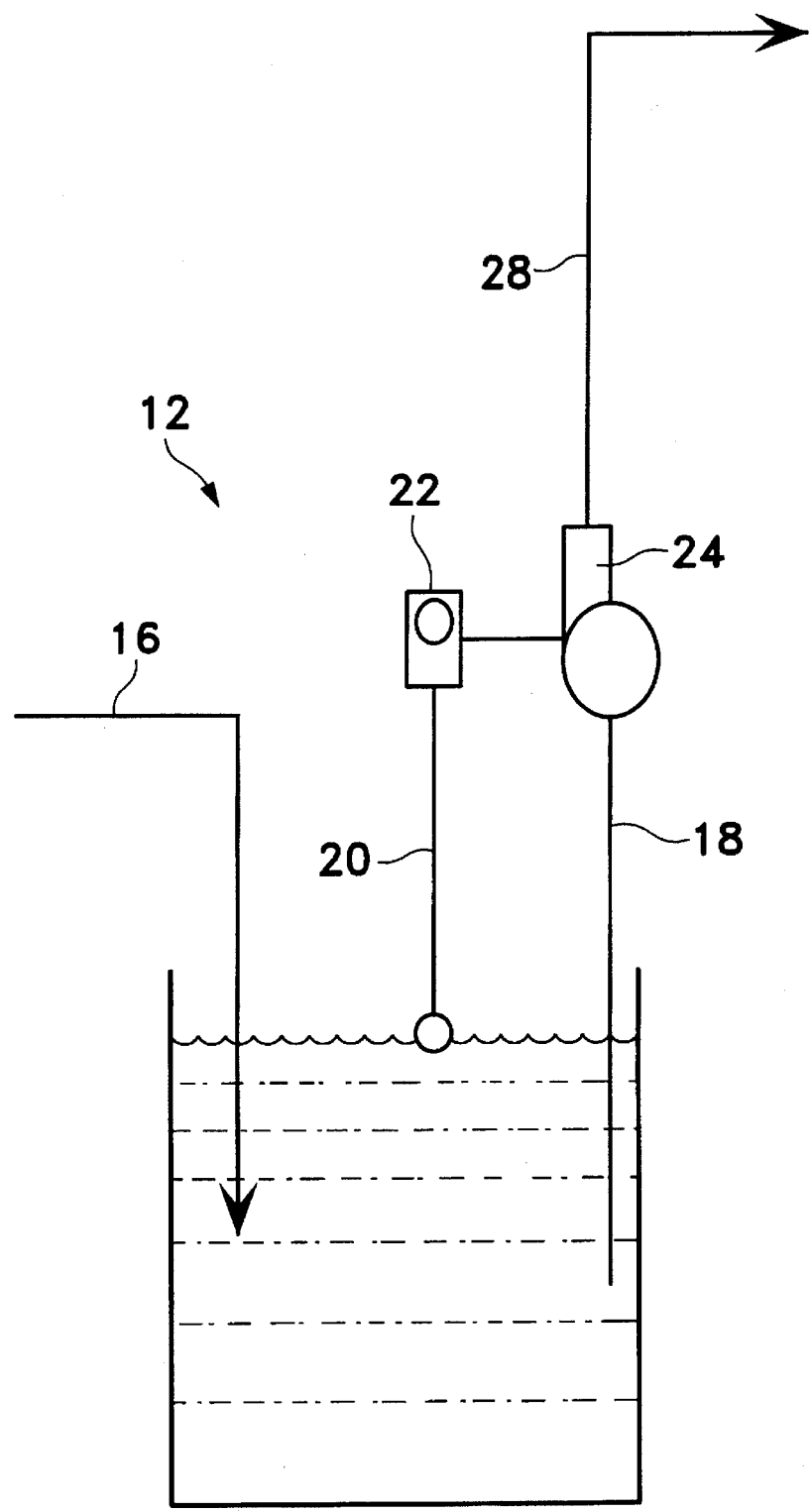
FIG. 2 is a schematic diagram of the sump tank.

FIG. 2 is a schematic diagram of the first tank or process step in the series: the sump or holding tank 12. The stream to be treated is delivered into the sump tank 12 via an inlet tube or pipe 16. This tank 12 is initially fairly empty and gradually fills as the stream empties into it. When the sump 12 is close to full, all the fluid in it is emptied out quite rapidly via an outlet tube or pipe 18 by means of a chemical resistant pump 24. The pump is activated by a liquid level meter 22, which is connected to a level probe 20. The height of the probe 20 can be varied in order to control the volume of liquid that is allowed to accumulate in the sump tank 12. Because it is emptied by a pump 24, the sump tank 12 does not have to be located at the same level as the other tanks of the invention 10.

Use of the sump tank 12 as the initial tank in the series is optional. If stream flow is slow or discontinuous, the sump tank 12 may be unnecessary. A sump or holding tank 12 may be required depending on the flow rate of the waste stream and the contaminants to be removed. The purpose of the sump tank 12 is to only allow discrete volumes of liquid to flow periodically from one tank to the other in the series. This allows time for the reagents that are introduced to fully react with the heavy metals in the stream. Typically, the system 10 is designed so that the level of liquid in the sump tank 12 is automatically lowered every time the level reaches a pre-set maximum.

Figure 3:
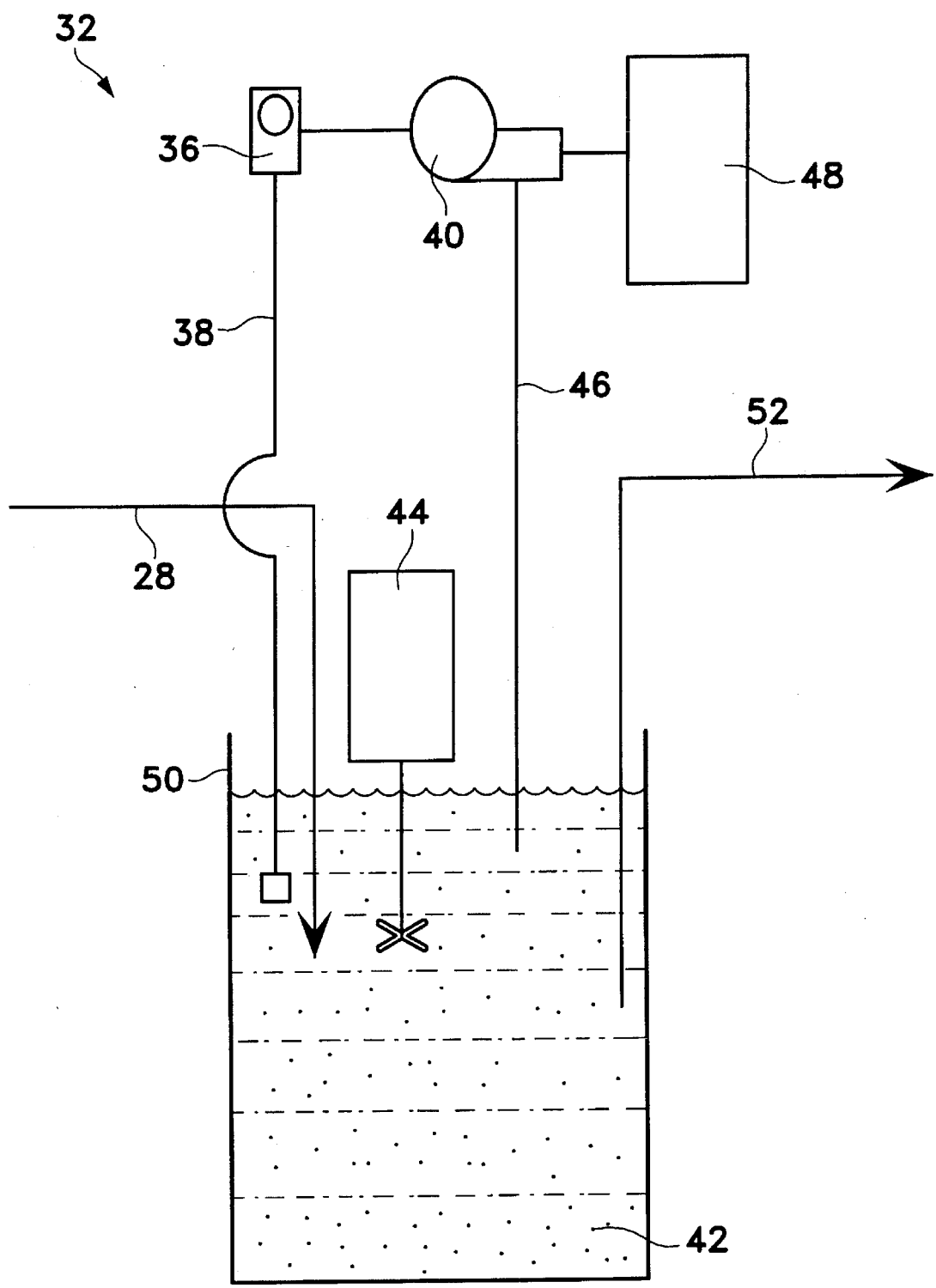
FIG. 3 is a schematic diagram of the preliminary pH adjustment tank.

FIG. 3 is a schematic diagram of the next tank or process step in the series: the preliminary pH adjustment tank 32. Typically the stream flows into this tank 32 via a tube or pipe 28 which is connected to the output of the sump pump 24. In this tank 32, the pH of the stream is raised. If the stream does not contain cyanides, a pH of approximately 8.5 to 9.5 is satisfactory. If the stream contains cyanides, a pH above 10.5 will be necessary. Generally the waste stream is neutral to acidic. In order to raise the pH a caustic solution is added. Preferably, NaOH is used but KOH, $NH_4OH$, $NH_3$, $CaCO_3$, $Ca(OH)_2$, CaO, $CO_2$, $Na_2CO_3$, $Na_2S_2O_5$, and $Na_2S \cdot 9H_2O$, are good alternatives. If, however, the waste stream has a high pH, it will be necessary to lower the pH with an acid such as $SO_2$, $H_2SO_4$, or HCl.

The pH adjusting solution is fed from a supply tank 48 via a pump 40 and inlet tube 46. The pump 40 is activated via a pH meter 36 which is connected to a pH probe 38. Preferably a mechanical mixer 44 is used to keep the solution well stirred. In this way the solution in the tank is maintained at the desired pH. If necessary, cyanides can also be destroyed in this tank by any convenient means. Typically, to accomplish cyanide destruction, a $Cl^-$ containing solution, like bleach, is metered into the solution. As an alternative, cyanides can be destroyed in a separate tank inserted ahead of the preliminary pH adjusting tank 32.

When the pH is raised all the heavy metals dissolved in the stream precipitate. Usually a metal hydroxide forms. The reaction can be represented by the generic formula:

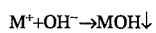

$$M^+ + OH^- \rightarrow MOH\downarrow$$

in which M stands for metal. It is well known that such metal hydroxides are finely divided and difficult to make settle. If the precipitate is known to be especially finely divided, a flocculant or precipitant can also be added by any convenient automatic metering means to the initial pH adjustment tank 32. The preferred flocculant or precipitant is a proprietary copolymer named Praestol manufactured by Stockhausen, Inc. of Greensboro, N.C. Other flocculants that may be used are $NH_3$, $CaCO_3$, anionic acrylamide, $Ca(OH)_2$, CaO, $CO_2$, $Ca(OH)_2MgO$, $CaO \cdot MgO$, petroleum hydrocarbon, $Na_2CO_3$, NaOH, $Na_2S_2O_5$, $Na_2S \cdot 9H_2O$, $SO_2$, $H_2SO_4$, HCl, $NaSH \cdot 2H_2O$, proprietary surfactant, or $(CH_3)_2NCS_2Na$. Since the solution is well stirred in this tank 32, the precipitates 42 are kept in suspension and do not settle.

Another function that can be realized in this tank 32 is precipitation of selenium. This is accomplished by addition of sodium dimethyldithiocarbamate (NaDMDTC) and oxygen. The NaDMDTC is metered in at about 0.25 percent by volume: the oxygen is most conveniently added via an air blower. The reaction results in precipitation of the selenium as the oxide.

Figure 4:
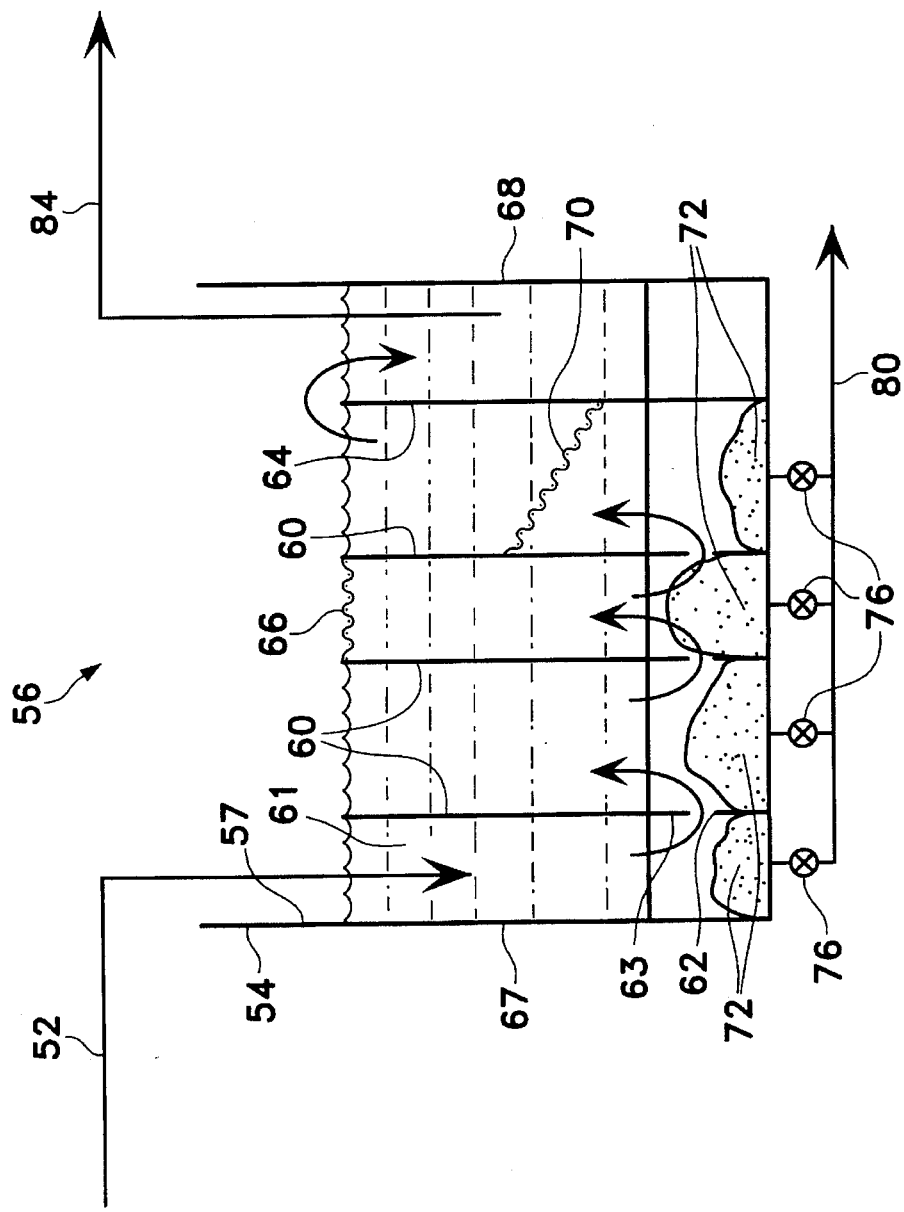
FIG. 4 is a schematic diagram of the clarifier tank in accordance with this invention.
Figure 5A:
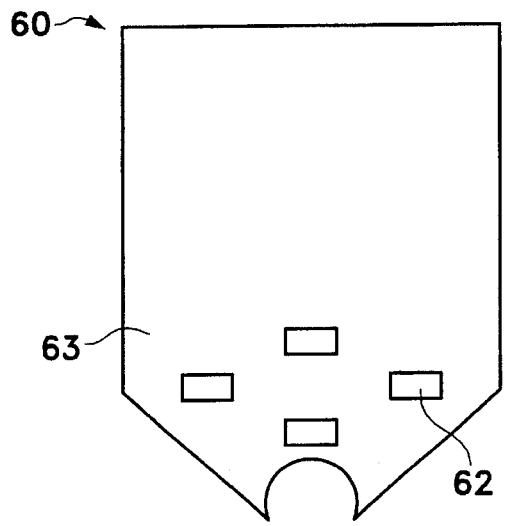
FIGS. 5A–D show elevations of several alternative baffle designs.
Figure 5B:
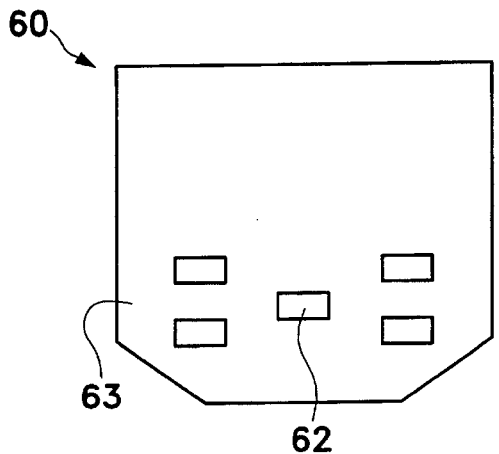
Figure 5C:
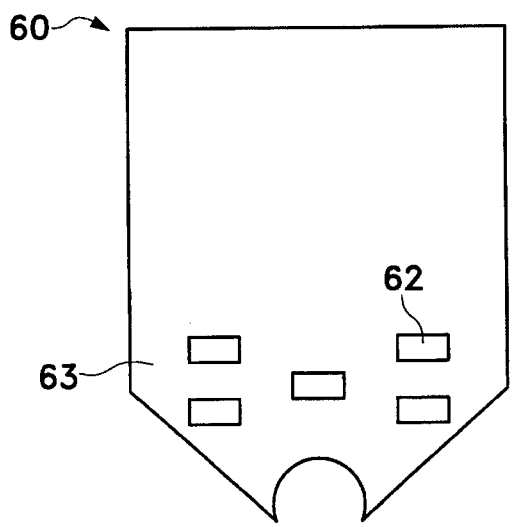
Figure 5D:
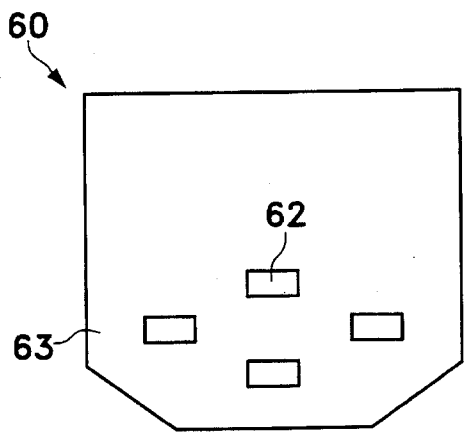

FIG. 4 is a schematic diagram of the clarifier 56. As the next discrete volume empties from the sump tank 12, an equal volume of initially treated liquid is transferred from the initial pH adjustment tank 32 into the clarifier tank 56 via a transfer mechanism 52. This mechanism 52 can be as simple as a horizontal pipe joining the two tanks 32, 56 below their lips 50, 54. If desired a weir in the preliminary pH adjustment tank 32, constructed in accordance with the art of building plating tanks, may be provided. In this way, simple overflow will accomplish the desired fluid transfer. Alternatively, transfer can be accomplished by means of piping and a transfer pump, similar to the method shown on FIG. 2 for transferring liquid from the sump tank 12 to the initial pH adjustment tank 32.

The clarifier tank 56 is larger than the initial pH adjustment tank 32. It also contains at least one perforated, vertical baffle 60 and at least one un-perforated vertical baffle 64. The baffles 60, 64 span the entire width of the clarifier tank 56 and separate the interior 57 of the tank 56 into several chambers 61. The perforated baffle or baffles 60 have perforations 62 near their lower ends 63. The baffles 60, 64 are just as high as the liquid is deep in the tank 56 and are spaced at desired intervals between the inlet end 67 and the outlet end 68 of the tank 56 with the perforated baffle or baffles 60 being placed before the un-perforated baffle or baffles 64 in relation to stream flow.

Gratings 66, 70 may placed between sequential perforated baffles 60. They may be horizontal 66 or angled 70 and may be placed at any height within the clarifier tank 56. If selenium has been precipitated in the preliminary pH adjustment tank 32, horizontal 66 and angled 70 gratings are required between all sequential perforated baffles 60.

As the discrete volume of liquid is pumped out of the sump tank 12, fluid flows from the inlet end 67 of the clarifier tank 56 into the first chamber 61. Then the fluid flows to the next chamber 61 and so on to the outlet end 68. The size of the clarifier tank 56 is selected so that this volume of liquid flows slowly, smoothly and without much disturbance. Because of the way the perforated baffle or baffles 60 are designed, the fluid flows primarily through the perforations 62 and under the baffle or baffles 60. Fluid flow over the perforated baffle or baffles 60 is slight. Because of the way the unperforated baffle or baffles 64 are designed, fluid can only flow over the un-perforated baffle or baffles 64. Major fluid flow is shown by the arrows on FIG. 4.

As a result of the smooth, constrained fluid flow the precipitates 42 settle out as sludges 72 in each of the chambers 61. The liquid that reaches the outlet end 68 is precipitate free. As the fluid flows from the inlet end 67 to the outlet end 68, its pH drops nearly to 7. It has been found, in streams containing several different metallic contaminants, that different metal oxides accumulate in different chambers 61. This provides a means for convenient metal recovery and separation.

The baffles 60, 64 and gratings 66, 70 are typically fastened in a fixed location in the interior 57 of the tank 56. However, to allow for flexibility in the installation and to accommodate changes in dissolved contaminants, provisions can be made for adjusting the locations of the baffles 60, 64 and gratings 66, 70. Any well known techniques such as slots or tabs can be provided for this purpose. Then it will be comparatively easy to change the locations of the baffles 60, 64 and gratings 66, 70.

Periodically, the sludge 72 must be removed from the clarifier 56. This can, of course, be accomplished by draining the tank 56 and physically removing the sludge 72. However, an arrangement of tubing 80 through the bottom 58 with a valve 76 will make sludge 72 removal easier. If it is desired to remove the sludge 72 from each chamber 61 separately, the tubing 80 can be made into a manifold with multiple valves 76. This is the arrangement depicted in FIG. 4. If desired, sludge 72 removal can be assisted by means of a suction system.

The sludge 72 can be treated in several different ways. It can be dewatered and disposed of in a landfill using conventional technology. However, the landfill must be capable of accepting hazardous metals. Alternatively the sludge 72 can be electrowinned, using standard technology, to recover the metals. The liquor remaining after the electrowinning process can be reused in whole or in part as the pH adjusting solution in the preliminary pH adjusting tank 32. If the liquor contains a lot of residual solids it can be filtered. The dewatered solids can then be disposed of to landfill while the filtered liquor can be used in whole or in part as the pH adjusting solution in the preliminary pH adjusting tank 32. The advantage here is that the solids do not now contain hazardous metals and can be disposed of to conventional landfills.

FIGS. 5A–D show elevation views of different perforated baffles 60. Rectangular baffles 60 are not illustrated on these Figures. The shapes of these baffles 60 are, of course, dictated by the interior shapes of the clarifier tanks 56 in which they will be inserted. Note that different perthration 62 patterns can be utilized. This can be seen by comparing FIGS. 5A with 5C and 5B with 5D. Other configurations can also be conceived and utilized. Rectangular perthrations 62 are illustrated on FIGS. 5A–D. However, other shapes for the perthrations, including circular, diamond, and star shaped are feasible and would work satisfactorily, also.

FIG. 6 is a three dimensional representation of the preferred design of the clarifier tank 56. While the tanks 12, 32, 56, 88 of this invention 10 can be rectangular, cylindrical or any other convenient shape, in order to make sludge 72 removal even easier, a shaped bottom 58 is preferred for the clarifier tank 56. The simplest shape, V-shaped, is shown in FIG. 6. Using the configuration shown on FIG. 6, a sludge removal tube 80 with perforations 82 can be placed inside the apex 59 of the triangular bottom 58. The tube 80 pierces either the inlet 67 or outlet 68 end of the tank 56. Sludge 72 can be removed from either end of this tube 80. This sludge removal configuration is an alternative to that shown in FIG. 4. FIG. 6 also illustrates how the baffles 60, 64 are located at right angles to the bottom 58 and side 65 of the clarifier tank 56.

Figure 7:
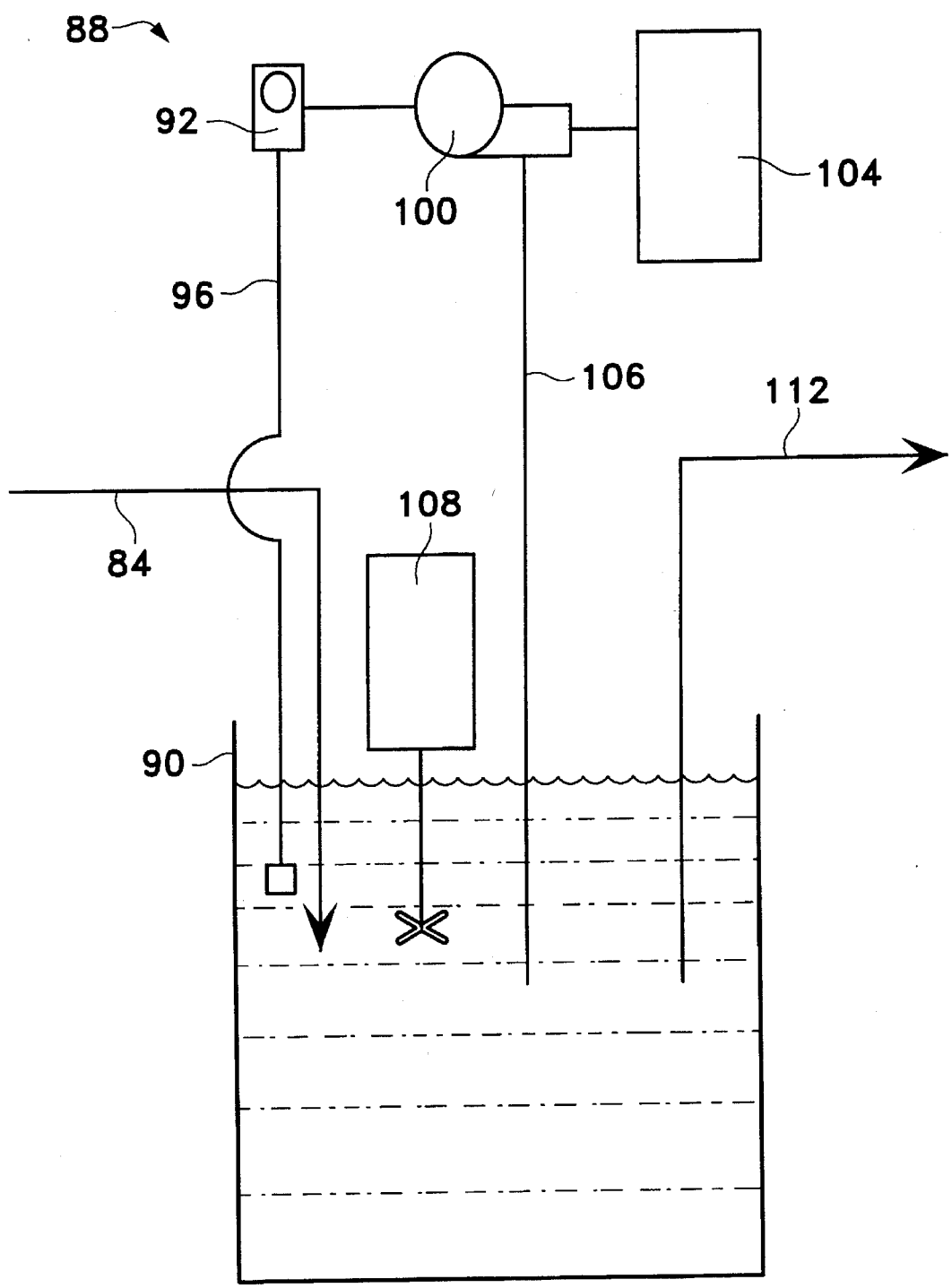
FIG. 7 is a schematic diagram of the final pH adjustment tank.

FIG. 7 is a schematic diagram of the final pH adjustment tank 88. After the fluid has flowed through the clarifier tank 56 it is free of metallic impurities and its pH is close to 7. At this point, the water may be suitable for discharge into a sewer or waterway, or re-use in some industrial process, like rinsing. However, to ensure that it meets applicable discharge requirements it is desirable to adjust the pH in the final pH adjustment tank 88. To accomplish this, the liquid is transferred into the final pH adjustment tank 88 by any convenient transfer mechanism 84. This mechanism 84 can be as simple as a horizontal pipe joining the two tanks 56, 88, below their lips 54, 90. If desired a weir, constructed in accordance with the art of building plating tanks, may be provided in the clarifier 56. In this way, simple overflow will accomplish the desired fluid transfer. Alternatively, transfer can be accomplished by means of piping and a transfer pump, similar to the method shown on FIG. 2 for transferring liquid from the sump tank 12 to the initial pH adjustment tank 32.

In order to lower the pH an acid solution is added. Hydrochloric acid is preferred but other acids, like $H_2SO_4$ or $HNO_3$ or citric acid, could also be used. The acid solution is fed from a supply tank 104 via a pump 100 and inlet tube 106. The pump 100 is activated via a pH meter 92 which is connected to a pH probe 96. Preferably a mechanical mixer 108 is used to keep the solution well stirred. In this way the solution in the tank is maintained at the desired pH.

A polishing filter may also be needed at this point. A polishing filter may be necessary to remove excess chlorides or suspended solids. The filter may comprise activated carbon, sand or diatomaceous earth. Alternatively a reverse osmosis filter may be utilized.

All tanks 12, 32, 56, 88, pipes 16, 18, 28, 46, 52, 84, 106, 112 and baffles 60, 64 used in this invention are fabricated from materials that are resistant to the solutions and chemicals which they will contact. Such materials are well known in the art and include stainless steels, polyethylene, polypropylene, vinyl and coated steel. Chemical resistant pumps 24, 40, 100 and mixers 40, 100 are commonly available. Likewise suitable pH meters 36, 92 and level controllers 22 are easily obtainable from commercial sources.

Figure 8:
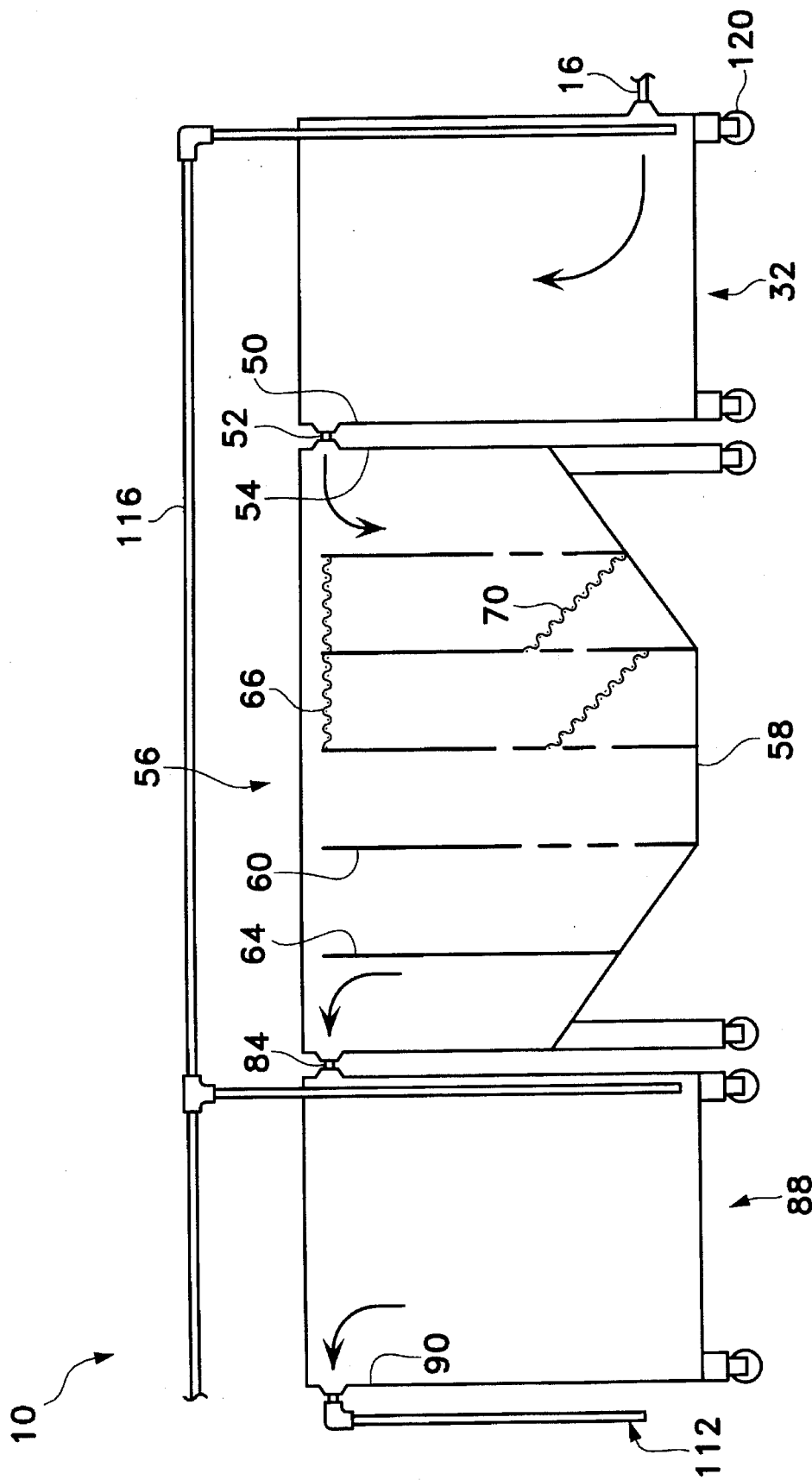
FIG. 8 is a simplified side view of a typical installation according to this invention.

It can readily be appreciated that the invention 10 can be used to remove metallic contaminants from any stream such as plating shop wastes, acid mine wastes and soil slurries. FIG. 8 is illustrative of a typical commercial installation of the invention 10 without the sump tank 12. For clarity many details have been omitted. Note that mixing of the liquid in the preliminary and final pH adjustment tanks 32, 88 is accomplished by air agitation 116 and the tanks 32, 56, 88 are interconnected by pipes 52, 84 located just below their lips 50, 54, 90. Also, the bottom 58 of the clarifier tank 56 tapers in two dimensions. Furthermore, this installation is built on casters 120 for ease of movement.

It has been found that this invention 10 is useful in removing the following heavy metal contaminants: antimony, arsenic, beryllium, cadmium, chromium, cobalt, copper, gold, hexavalent chromium, iron, manganese, mercury, molybdenum, nickel, palladium, platinum, selenium, silver, tin, titanium, tungsten and zinc. This is not an exclusive list: the invention 10 is capable of removing other metals as well as cyanides and small amounts of oil. The following examples will further illustrate the capabilities of this invention 10.

EXAMPLE I

A system 10 was installed in an electrical manufacturing plant located in Mexico. The flow rate of the plant is 2,500 gallons per hour or 20,000 gallons in an eight hour shift. The discharge is regulated by SEDUE (the Mexican equivalent of the EPA). The following table summarizes the concentrations of contaminants in the waste stream before and after treatment.

|  | Before Treatment (parts per million) | After Treatment (parts per million) |
| --- | --- | --- |
| Cyanide | 29.70 | .0197 |
| Lead | .85 | .1 |
| Nickel | 75.0 | .13 |
| Iron | 57.0 | .4 |
| Zinc | 56.0 | .5 |
| Manganese | .41 | <.01 |
| Copper | 29.0 | 1.1 |
| Suspended solids | 566.0 | 4.0 |

EXAMPLE II

A system 10 was installed in a plating plant located in Salt Lake City, Utah. The flow rate of the plant is 1,250 gallons per hour or 10,000 gallons in an eight hour shift. The discharge is regulated by the EPA. The following table summarizes the concentrations of contaminants in the waste stream before and after treatment.

|  | Before Treatment (parts per million) | After Treatment (parts per million) |
| --- | --- | --- |
| Silver | .05 | none detected |
| Cadmium | .05 | none detected |
| Chromium | 2.0 | <0.007 |
| Copper | .9 | none detected |
| Nickel | .05 | none detected |
| Lead | .05 | none detected |
| Zinc | 5.0 | 0.245 |
| Suspended solids | 8.1 | <0.252 |

EXAMPLE III

A system 10 was installed in a testing laboratory located in Salt Lake City, Utah. The flow rate of the plant is 375 gallons per hour or 3,000 gallons in an eight hour shift. The discharge is regulated by EPA. The following table summarizes the concentration of chromium in the waste stream before and after treatment.

|  | Before Treatment (parts per million) | After Treatment (parts per million) |
| --- | --- | --- |
| Chromium | 40.100 | .096 |

The apparatus 10 has been described with reference to a particular embodiment. However, it should be obvious to those skilled in the art to which this invention pertains that other modifications and enhancements can be made without departing from the spirit and scope of the claims that follow.

What is claimed is:

1. An apparatus for removing a contaminant from and adjusting a pH of a stream comprising:

a preliminary balance means for raising said pH to and maintaining said pH above about 8.5; said preliminary balance means including a preliminary pH balance tank, means for accepting a volume of said stream into said preliminary pH balance tank, means for automatically adding a pH adjusting chemical to said stream in said preliminary pH balance tank and means for stirring said stream in said preliminary pH balance tank; whereby said contaminant is converted into a precipitate and said precipitate is kept in suspension;

a clarifier means for separating said precipitate from said stream; said clarifier means including a clarifier tank; said clarifier tank having a bottom, a side, a first internal vertical baffle, a second internal vertical baffle, an inlet end and an outlet end; said clarifier means also including means for conveying said stream from said preliminary balance means into said inlet end of said clarifier tank; said first internal vertical baffle having a perforation near its lower end; said first internal vertical baffle and second internal vertical baffle being supported in contact with and essentially at right angles to said bottom and said side; said first internal vertical baffle and said second internal vertical baffle being located and sized so that said stream flows over and under said first internal vertical baffle, through said perforation in said first internal vertical baffle and over said second internal vertical baffle; whereby said precipitate settles and said pH drops; and a delivery means for conveying said stream from said outlet end of said clarifier tank.

2. An apparatus as claimed in claim 1 further including a grating attached to said first internal vertical baffle.

3. An apparatus as claimed in claim 1 in which the locations of said first internal vertical baffle and second vertical baffle within said clarifier tank are horizontally variable.

4. An apparatus as claimed in claim 1 further comprising hexavalent chromium reducing means; said hexavalent chromium reducing means including a reduction tank; means for accepting said stream into said reduction tank; means for detecting oxidation reduction potential in said stream in said reduction tank; means, responsive to oxidation reduction potential, for acidifying and adding a reducing agent to said stream in said reduction tank; and means for transferring said stream to said preliminary balance means; whereby hexavalent chromium is reduced to trivalent chromium prior to introduction of said stream into said preliminary balance tank.

5. An apparatus as claimed in claim 1 in which said preliminary pH balance tank also includes cyanide destruction means; said cyanide destruction means including means for adding a chlorine containing oxidizing agent; whereby cyanide in said stream is destroyed in said preliminary balance tank.

6. An apparatus as claimed in claim 1 in which said preliminary balance means also includes means for automatically introducing a flocculant into said preliminary pH balance tank.

7. An apparatus as claimed in claim 1 in which said preliminary balance means also includes selenium precipitation means; said selenium precipitation means including means for adding sodium dimethyldithiocarbamate and oxygen; whereby selenium is also precipitated in said preliminary pH balance tank.

8. An apparatus as claimed in claim 1 further comprising a final balance means for lowering said pH to and maintaining said pH at about 7; said final balance means including a final pH balance tank, means for transferring said stream from said delivery means into said final pH balance tank, means for automatically adding an acid solution to said final pH balance tank, means for stirring said stream in said final pH balance tank and means for disposing of said stream.

9. An apparatus for removing a contaminant from and adjusting a pH of a stream comprising:

a preliminary balance tank including means for automatically adding a pH adjusting chemical to and means for stirring said stream; whereby said pH of said stream is adjusted to and maintained at a desired value, said contaminant is converted into a precipitate and said precipitate is kept in suspension;

means for transferring a volume of said stream into said preliminary balance tank;

a clarifier tank having a bottom, a side, a first internal vertical baffle, a second internal vertical baffle, an inlet end and an outlet end; said first internal vertical baffle having a perforation near its lower end; said first internal vertical baffle and said second internal vertical baffle being supported in contact with and essentially at right angles to said bottom and said side; said first internal vertical baffle and said second internal vertical baffle being located and sized so that said stream flows over and under said first internal vertical baffle, through said perforation in said first internal vertical baffle and over said second internal vertical baffle; whereby said precipitate settles and said pH drops;

means for conveying said stream from said preliminary balance tank into said inlet end of said clarifier tank; and means for delivering said stream from said outlet end of said clarifier tank.

10. An apparatus as claimed in claim 9 further comprising:

a final balance tank having means for automatically adding an acid solution to and means for stirring said stream, whereby said pH of said stream is lowered to and maintained at about 7;

means for accepting said stream from said means for delivery into said final balance tank; and means for disposing of said stream from said final balance tank.

11. An apparatus as claimed in claim 10 in which said acid is selected from the group comprising hydrochloric acid, nitric acid, sulfuric acid and citric acid.

12. An apparatus as claimed in claim 11 in which said final balance tank is made from a material selected from the group consisting of steel, stainless steel, fiberglass, plastic, plastic coated steel and plastic coated concrete.

13. An apparatus as claimed in claim 9 in which said means for automatically adding a pH adjusting chemical includes a supply tank, a pH adjusting chemical in said supply tank, means for detecting pH in said preliminary balance tank, and means, responsive to said means for detecting pH in said preliminary balance tank, for transferring an appropriate amount of said pH adjusting chemical into said preliminary balance tank.

14. An apparatus as claimed in claim 13 in which said pH adjusting chemical is selected from the group consisting of NaOH, KOH, $NH_4OH$, $NH_3$, $CaCO_3$, $Ca(OH)_2$, CaO, $CO_2$, $Na_2CO_3$, $Na_2S_2O_5$, $Na_2S \cdot 9H_2O$, $SO_2$, $H_2SO_4$, $HNO_2$ and HCl.

15. An apparatus as claimed in claim 14 in which said desired value is about 8.5 to 9.5.

16. An apparatus as claimed in claim 15 further comprising hexavalent chromium reducing means; said hexavalent chromium reducing means including a reduction tank; means for accepting said stream into said reduction tank; means for detecting oxidation reduction potential in said stream in said reduction tank; means, responsive to oxidation reduction potential, for acidifying and adding a reducing agent to said stream in said reduction tank; and means for transferring said stream to said preliminary balance means; whereby hexavalent chromium is reduced to trivalent chromium prior to introduction of said stream into said preliminary balance tank.

17. An apparatus as claimed in claim 14 in which said desired value is above 10.5 and said preliminary pH balance tank also includes cyanide destruction means; said cyanide destruction means including means for adding a chlorine containing oxidizing agent; whereby cyanide in said stream is also destroyed in said preliminary balance tank.

18. An apparatus as claimed in claim 17 further comprising hexavalent chromium reducing means; said hexavalent chromium reducing means including a reduction tank; means for accepting said stream into said reduction tank; means for detecting oxidation reduction potential in said stream in said reduction tank; means, responsive to oxidation reduction potential, for acidifying and adding a reducing agent to said stream in said reduction tank; and means for transferring said stream to said preliminary balance means; whereby hexavalent chromium is reduced to trivalent chromium prior to introduction of said stream into said preliminary balance tank.

19. An apparatus as claimed in claim 14 in which said preliminary balance tank also includes means for automatically introducing a flocculant into said stream.

20. An apparatus as claimed in claim 19 in which said flocculant is selected from the group consisting of anionic acrylamide, Stockhausen Praestol copolymer, $Ca(OH)_2 \cdot MgO$, $CaO \cdot MgO$, $Na_2S \cdot 9H_2O$, $NaSH \cdot 2H_2O$, surfactant, and $(CH_3)_2NCS_2Na$.

21. An apparatus as claimed in claim 14 in which said preliminary balance tank also includes selenium precipitation means; said selenium precipitation means including means for adding sodium dimethyldithiocarbamate and oxygen; whereby selenium is also precipitated in said preliminary pH balance tank.

22. An apparatus as claimed in claim 21 in which said sodium dimethyldithiocarbamate is metered in at about 0.25 percent by volume.

23. An apparatus as claimed in claim 9 further including a grating attached to said first internal vertical baffle.

24. An apparatus as claimed in claim 23 in which said bottom is essentially V-shaped.

25. An apparatus as claimed in claim 24 in which said clarifier tank also includes means for periodic precipitate removal.

26. An apparatus as claimed in claim 25 in which said means for periodic precipitate removal includes a perforated tube located horizontally, just above said bottom; said perforated tube piercing said first internal vertical baffle, said second internal vertical baffle and one of said ends.

27. An apparatus as claimed in claim 26 in which the locations of said first internal vertical baffle and said second internal vertical baffle within said clarifier tank are horizontally variable.

28. An apparatus as claimed in claim 27 in which said preliminary balance tank and said clarifier tank are made from a material selected from the group consisting of steel, stainless steel, fiberglass, plastic, plastic coated steel and plastic coated concrete.

29. An apparatus as claimed in claim 28 in which said first internal vertical baffle, said second internal vertical baffle, said grating and said perforated tube are made from a material selected from the group consisting of steel, stainless steel, fiberglass, plastic and plastic coated steel.

30. An apparatus as claimed in claim 29 in which said means for automatically adding a pH adjusting chemical includes a supply tank, a pH adjusting chemical in said supply tank, means for detecting pH in said preliminary balance tank, and means, responsive to said means for detecting pH in said preliminary balance tank, for transferring an appropriate amount of said pH adjusting chemical into said preliminary balance tank.

31. An apparatus as claimed in claim 30 further including means for electrowinning said precipitate, whereby metals can be recovered and a liquor and a sludge will remain.

32. An apparatus as claimed in claim 31 further including means for reusing a percentage of said liquor and said sludge as said pH adjusting chemical.

33. An apparatus as claimed in claim 32 in which said percentage is approximately 100 percent.

34. An apparatus as claimed in claim 31 further including means for dewatering said sludge so that said sludge can be disposed of to a sanitary landfill and said liquor remains.

35. An apparatus as claimed in claim 34 further including means for reusing a percentage of said liquor as said pH adjusting chemical.

36. An apparatus as claimed in claim 35 in which said percentage is approximately 100 percent.

37. An apparatus as claimed in claim 30 in which said pH adjusting chemical is selected from the group consisting of NaOH, KOH, $NH_4OH$, $NH_3$, $CaCO_3$, $Ca(OH)_2$, CaO, $CO_2$, $Na_2CO_3$, $Na_2S_2O_5$, $Na_2S \cdot 9H_2O$, $SO_2$, $H_2SO_4$, $HNO_2$ and HCl.

38. An apparatus as claimed in claim 37 in which said desired value is about 8.5 to 9.5.

39. An apparatus as claimed in claim 38 further comprising hexavalent chromium reducing means; said hexavalent chromium reducing means including a reduction tank; means for accepting said stream into said reduction tank; means for detecting oxidation reduction potential in said stream in said reduction tank; means, responsive to oxidation reduction potential, for acidifying and adding a reducing agent to said stream in said reduction tank; and means for transferring said stream to said preliminary balance means; whereby hexavalent chromium is reduced to trivalent chromium prior to introduction of said stream into said preliminary balance tank.

40. An apparatus as claimed in claim 37 in which said desired value is above 10.5 and said preliminary pH balance tank also includes cyanide destruction means; said cyanide destruction means including means for adding a chlorine containing oxidizing agent; whereby cyanide in said stream is also destroyed in said preliminary balance tank.

41. An apparatus as claimed in claim 40 further comprising hexavalent chromium reducing means; said hexavalent chromium reducing means including a reduction tank; means for accepting said stream into said reduction tank; means for detecting oxidation reduction potential in said stream in said reduction tank; means, responsive to oxidation reduction potential, for acidifying and adding a reducing agent to said stream in said reduction tank; and means for transferring said stream to said preliminary balance means; whereby hexavalent chromium is reduced to trivalent chromium prior to introduction of said stream into said preliminary balance tank.

42. An apparatus as claimed in claim 37 in which said preliminary balance tank also includes means for automatically introducing a flocculant into said stream.

43. An apparatus as claimed in claim 42 in which said flocculant is selected from the group consisting of anionic acrylamide, Stockhausen Praestol copolymer, $Ca(OH)_2 \cdot MgO$, $CaO \cdot MgO$, $Na_2S \cdot 9H_2O$, $NaSH \cdot 2H_2O$, surfactant, and $(CH_3)_2NCS_2Na$.

44. An apparatus as claimed in claim 37 in which said preliminary balance tank also includes selenium precipitation means; said selenium precipitation means including means for adding sodium dimethyldithiocarbamate and oxygen; whereby selenium is also precipitated in said preliminary pH balance tank.

45. An apparatus as claimed in claim 44 in which said sodium dimethyldithiocarbamate is metered in at about 0.25 percent by volume.

* * * * *